(12) United States Patent
Kim

(10) Patent No.: US 9,367,175 B2
(45) Date of Patent: Jun. 14, 2016

(54) CAMERA MODULE FOR OPTICAL TOUCHSCREEN

(71) Applicants: MOS Co., Ltd., Seoul (KR); Sung-Han Kim, Seoul (KR)

(72) Inventor: Sung-Han Kim, Seoul (KR)

(73) Assignees: MOS CO., LTD., Seoul (KR); Sung-Han Kim, Seoul (KR)

( * ) Notice: Subject to any disclaimer, the term of this patent is extended or adjusted under 35 U.S.C. 154(b) by 184 days.

(21) Appl. No.: 13/972,012

(22) Filed: Aug. 21, 2013

(65) Prior Publication Data

US 2014/0055419 A1  Feb. 27, 2014

(30) Foreign Application Priority Data

Aug. 24, 2012 (KR) .................. 10-2012-0093212

(51) Int. Cl.
*G06F 3/042* (2006.01)

(52) U.S. Cl.
CPC ............ *G06F 3/0425* (2013.01); *G06F 3/0428* (2013.01)

(58) Field of Classification Search
CPC ..... G06F 3/042; G06F 3/0421; G06F 3/0425; G06F 3/0428; G06F 2203/04103; G02F 2001/291; H04N 5/2251; H04N 5/2254; H04N 5/2257; G02B 6/0038; G02B 6/0081; G02B 6/0083; G02B 6/0021; G02B 6/4243; G02B 6/4244; G02B 6/4245; G02B 7/182; G02B 7/1822; G02B 7/1824; G02B 7/1825; G02B 7/04

See application file for complete search history.

(56) References Cited

U.S. PATENT DOCUMENTS

| 6,100,538 | A | 8/2000 | Ogawa | |
|---|---|---|---|---|
| 6,504,532 | B1 * | 1/2003 | Ogasahara et al. | ........... 345/175 |
| 7,781,722 | B2 * | 8/2010 | Lieberman et al. | ........... 250/221 |
| 8,976,156 | B2 | 3/2015 | Lee | |
| 2004/0132491 | A1 * | 7/2004 | Kim et al. | .................. 455/556.1 |
| 2008/0278460 | A1 | 11/2008 | Arnett et al. | |
| 2010/0253637 | A1 * | 10/2010 | Lieberman et al. | ........... 345/173 |
| 2010/0309169 | A1 | 12/2010 | Lieberman et al. | |
| 2010/0315383 | A1 | 12/2010 | Chang et al. | |
| 2012/0242622 | A1 | 9/2012 | Tseng et al. | |
| 2012/0299879 | A1 | 11/2012 | Kim | |
| 2013/0002611 | A1 * | 1/2013 | Kim | .............................. 345/175 |
| 2013/0106788 | A1 | 5/2013 | Hwang | |
| 2013/0106790 | A1 | 5/2013 | Lee | |

FOREIGN PATENT DOCUMENTS

| CN | 102207798 A | 10/2011 | |
|---|---|---|---|
| JP | 11-3170 A | 1/1999 | |
| KR | 10-0993602 | 11/2010 | |
| KR | 10-1070864 | 10/2011 | |
| KR | 10-2012-0008665 | 2/2012 | |
| TW | 200912200 A | 3/2009 | |
| TW | 201214248 A1 | 4/2012 | |
| TW | 201232366 A1 | 8/2012 | |
| WO | WO2011/071305 * | 6/2011 | .............. G06F 3/042 |
| WO | WO2011083956 * | 7/2011 | .............. H04N 5/225 |
| WO | WO 2011/111033 A1 | 9/2011 | |

OTHER PUBLICATIONS

Taiwanese Office Action issued on Feb. 13, 2015 in Taiwanese Patent Application No. 10420215520 (1 page in English, 5 pages in Taiwanese).

* cited by examiner

*Primary Examiner* — Keith Crawley
(74) *Attorney, Agent, or Firm* — NSIP Law

(57) ABSTRACT

A camera module for an optical touchscreen includes a body part and a light emitting device coupling part. The body part may be disposed on one side corner of a touch region, provided with a light receiving hole at a portion thereof facing a center of the touch region, and provided with a lens mounted to correspond to the light receiving hole and an image sensor disposed to receive light collected through the lens. The light emitting device coupling part may be formed on at least one side of the body part that faces each edge of the touch region, and configured to be coupled to a light emitting device.

6 Claims, 10 Drawing Sheets

CAMERA MODULE FOR OPTICAL TOUCHSCREEN

CROSS-REFERENCE TO RELATED APPLICATION

This application claims the benefit under 35 U.S.C. §119 (a) of a Korean Patent Application No. 10-2012-0093212, filed on Aug. 24, 2012, in the Korean Intellectual Property Office, the entire disclosure of which is incorporated herein by reference for all purposes.

BACKGROUND

1. Field

The following description relates to a camera module for an optical touchscreen employed in an optical touchscreen that can recognize coordinates of a touch when a screen is touched using a finger or a touch pen.

2. Description of the Related Art

In development of various display apparatuses, such as a liquid crystal display (LCD), a touchscreen is considered to be one of the most efficient input devices capable of proving a simple and easy interface between a display apparatus and a user. Such a touchscreen enables various devices, such as a computer, a mobile phone, a banking terminal, and a game console, to be visually manipulated in an easy manner using a finger or a touch pen, and thus is applied to various areas.

A commercial way of implementing the conventional touchscreen includes an electrical method and an optical method. The electrical method includes a resistive type and a capacitive type. The optical method includes an infrared matrix type and a camera type. The camera type is implemented by calculating coordinates of touch from an angle of a touch-object viewed by two or more cameras.

In general, the camera type touchscreen is provided with a support member supporting a touch region. The support member is formed by a frame supporting a periphery of a touch region, or by a glass covering an entire area of the touch region. The cameras are installed at both corners of the support member. In addition, lightings are installed on the edges of the support member to emit infrared rays toward the touch region. However, according to the conventional technology, in general, the cameras and the lightings are individually installed on the support member, so that the installation process is complicated and the installation precision is degraded.

SUMMARY

The following description relates to a camera module ensuring easy and precise installation thereof when an optical touchscreen is manufactured.

In one general aspect, a camera module for an optical touchscreen includes a body part and a light emitting device coupling part. The body part may be disposed on one side corner of a touch region, provided with a light receiving hole at a portion thereof facing a center of the touch region, and provided with a lens mounted to correspond to the light receiving hole and an image sensor disposed to receive light collected through the lens. The light emitting device coupling part may be formed on at least one side of the body part that faces each edge of the touch region, and configured to be coupled to a light emitting device.

As is apparent from the above, the camera module is configured to be coupled to a light emitting device, or configured to be coupled to an optical splitter together with a light emitting device, so that the camera modules, the light emitting devices, and the optical splitters are more easily and precisely installed on the frame when the touchscreen is manufactured.

Other features and aspects will be apparent from the following detailed description, the drawings, and the claims.

Figure 1:
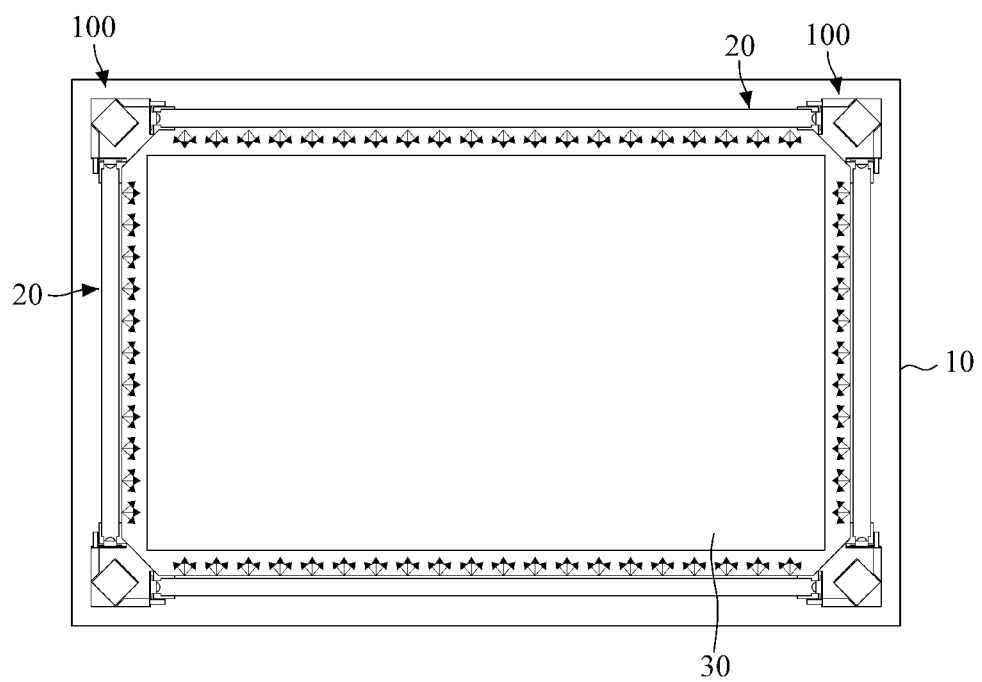
FIG. 1 is a front view illustrating a touchscreen employing a camera module in accordance with an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, while parts of the present invention are named and described below with reference to their functionalities, alternative terminology may be employed, as desired by a user, operator, or according to conventional practice, without altering the contents of the disclosure.

FIG. 1 is a front view illustrating a touchscreen employing a camera module in accordance with an embodiment of the present disclosure.

Referring to FIG. 1, an optical touchscreen includes a frame 10, micro-coordinate light source generating units 20, and camera modules 100.

The frame 10 is installed to support a periphery of a touch region 30 while surrounding the periphery. Herein, the touch region 30 corresponds to a screen area of various display devices, such as a liquid crystal display (LCD). In a case in which the touch region 30 is provided in a rectangular shape, the frame 10 is provided in a rectangular shape to support the periphery of the touch region 30. In a case in which the touch region 30 is provided in a triangular shape or a pentagonal shape, the frame 10 is provided in a triangular shape or a pentagonal shape to support the periphery of the touch region 30. According to another example, a glass panel may be installed to cover an entire surface of the touch region 30 to support the touch region 30 instead of using the frame 10 to support the touch region 30.

The micro-coordinate light source generating units 20 and the camera modules 100 may be mounted on the frame 10 and supported. The micro-coordinate light source generating units 20 each generate lightings, and are configured to provide normal coordinates for a horizontal axis and a vertical axis on the touch region 30. The micro-coordinate light source generating units 20 are installed on at least one of crosswise two edges (upper/lower sides) and lengthwise two edges (left/right sides) of the frame 10. In a case in which the micro-coordinate light source generating units 20 are installed on the four edges of the frame 10, the micro-coordinate light source generating units 20 generate micro-coordinate light sources from the four edges inside the frame 10 toward the touch region 30 at predetermined intervals. Here, the micro-coordinate light source generating units 20 may generate the micro-coordinate light sources in the form of infrared rays.

Figure 2:
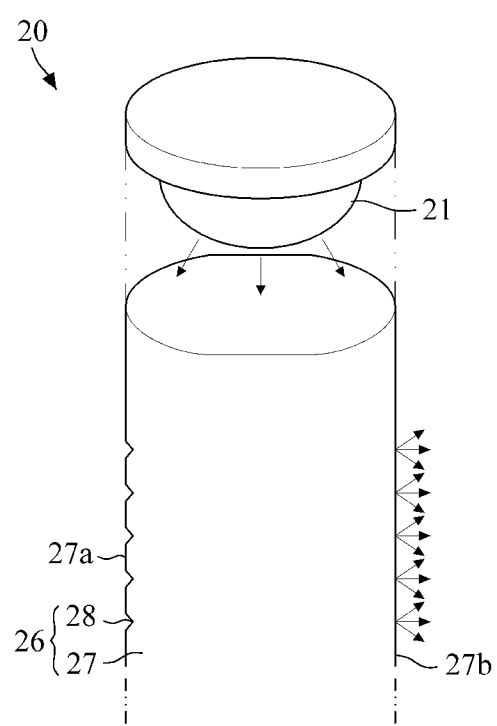
FIG. 2 is a perspective view illustrating an example of operation of a light emitting device and an optical splitter shown in FIG. 1.

Referring to FIG. 2, the micro-coordinate light source generating unit 20 includes at least one light emitting device 21 and at least one optical splitter 26. As the light emitting device 21, an infrared light emitting diode (LED) may be used. The optical splitter 26 distributes the light emitted from the light emitting device 21 into the micro-coordinate light sources that are disposed at predetermined intervals. For example, the optical splitter 26 may include a light transmitting rod 27.

The light transmitting rod 27 may be formed of light transmissive plastic or glass having a high refractive index. The light transmitting rod 27 is formed at one side portion 27a thereof with micro-grooves 28 that are disposed at predetermined intervals in a longitudinal direction of the light transmitting rod 27. The light emitting device 21 is disposed on at least one end portion of the light transmitting rod 27.

When light is transmitted from the light emitting device 21 to one end portion of the light transmitting rod 27, scattered reflection occurs at the respective micro-grooves 28. Some of the scattered reflection of light is collected while passing through the inside of the light transmitting rod 27, and then emitted through the other side portion 27b of the light transmitting rod 27. Accordingly, micro-coordinate light sources are generated from the other side portion 27b of the light transmitting rod 27 at predetermined intervals. The one side portion 27a, on which the micro-grooves 28 are formed, and the other side portion 27b of the light transmitting rod 27 are formed to be bulged outward in a convex shape to enhance the light collecting effect.

Although not shown, a reflection member may be disposed at the one side portion 27a of the light transmitting rod 27 on which the micro-grooves 28 are formed, so that the brightness of the micro-coordinate light sources generated from the light transmitting rod 27 may be increased. Meanwhile, other than the above description, the optical splitter may be configured to generate the micro-coordinate light sources through the one side portion on which the micro-grooves are formed, and thus the optical splitter may be configured in a variety within a scope in which the optical splitter performs the above function. In addition, the light transmitting rod 27 may be surrounded by a cover such that the light transmitting rod 27 is easily attached to the frame 10. The cover may be provided in a rectangular shape, an elliptical shape, or a circular shape having a hollow, and a portion of the cover corresponding to a light emitting portion of the light transmitting rod 27 may have a penetrative characteristic or may be open.

The camera modules 100 are installed on the frame 10 to sense the micro-coordinate light sources generated by the micro-coordinate light source generating units 20. The camera modules 100 sense the positions of micro-coordinate light sources among the micro-coordinate light sources that are blocked by a touch object, and provide the sensed positions to a controller, so that the controller calculates coordinates of the touch object that is touched on the touch region.

In a case in which infrared micro-coordinate light sources are generated by the micro-coordinate light source generating units 20, the camera modules 100 are configured to have a sufficient sensitivity to infrared rays. The camera modules 100 are illustrated as composed of four camera modules 100 that are installed at the four corners, respectively, but according to another example, the camera modules 100 may be composed of less or more than four camera modules.

Figure 3:
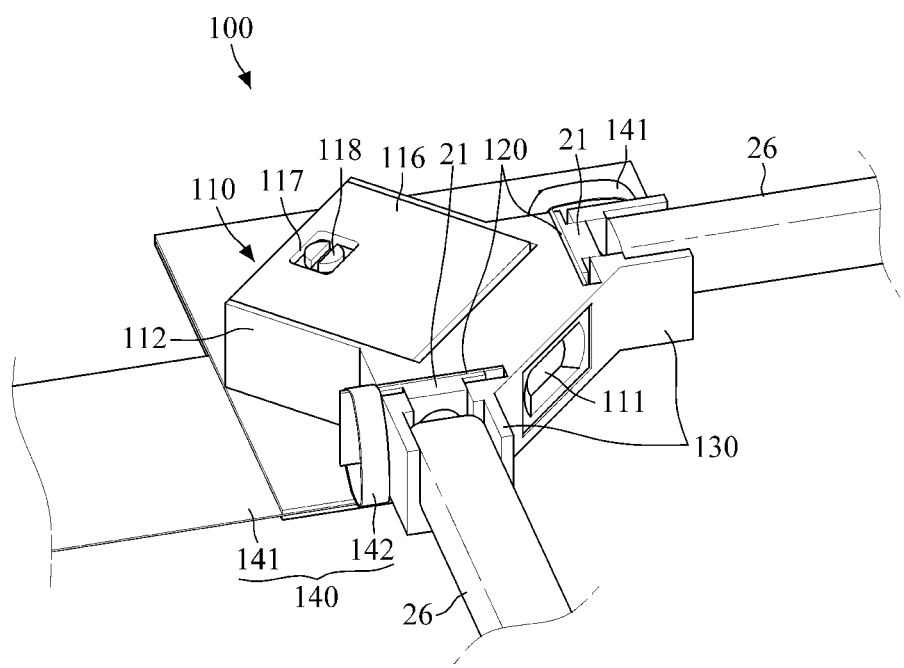
FIG. 3 is a perspective view illustrating the camera module shown in FIG. 1.
Figure 4:
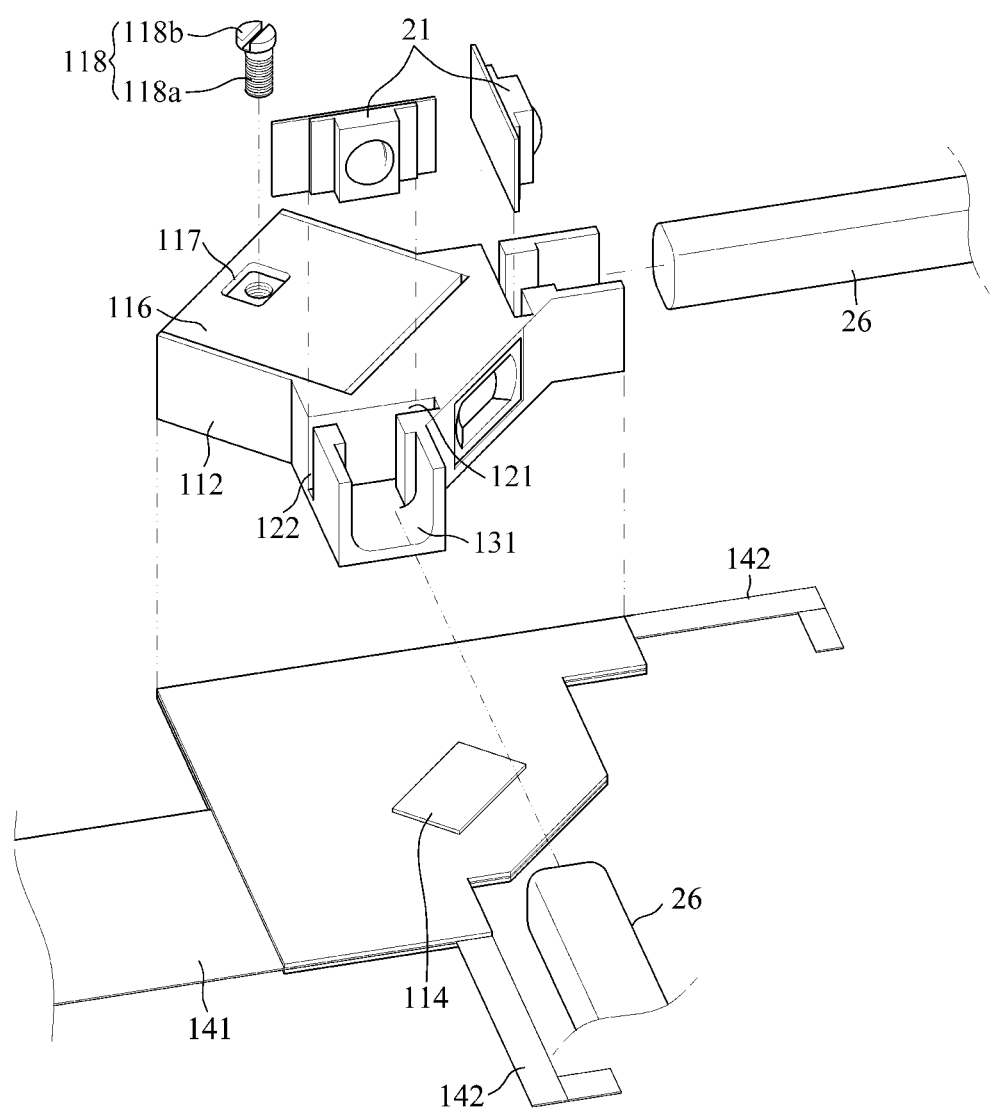
FIG. 4 is an exploded perspective view of a portion of FIG. 3.
Figure 5:
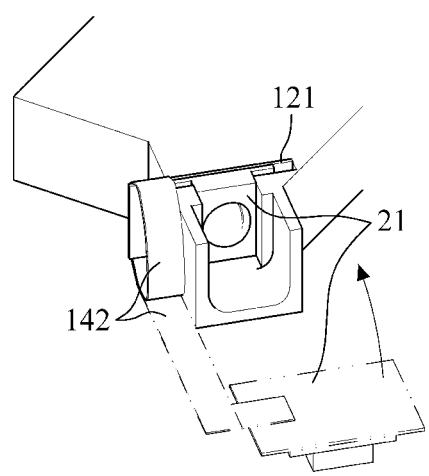
FIG. 5 is a drawing illustrating a process of assembling a light emitting device to a body part shown in FIG. 3.
Figure 6:
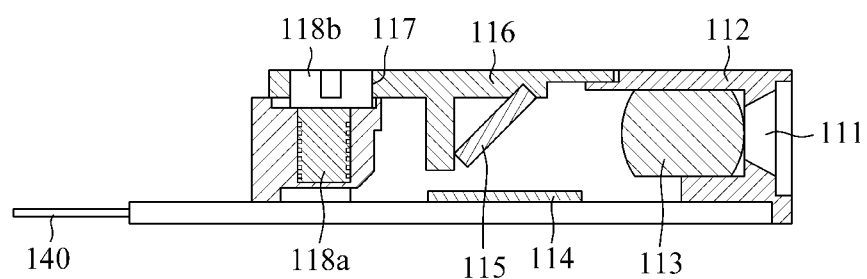
FIG. 6 is a cross-sectional view of FIG. 3.

The camera module 100 in accordance with an embodiment of the present disclosure may be configured to be coupled to the light emitting device 21. This will be described with reference to FIGS. 3 to 6. Here, FIG. 3 is a perspective view illustrating the camera module shown in FIG. 1, FIG. 4 is an exploded perspective view illustrating a portion of FIG. 3, FIG. 5 is a drawing illustrating a process of assembling a light emitting device to a body part shown in FIG. 3, and FIG. 6 is a cross-sectional view of FIG. 3.

The camera module 100 includes a body part 110 and light emitting device coupling parts 120. The body part 110 is disposed at one corner of the touch region 30. The body part 110 is provided at a portion thereof facing a center of the touch region 30 with a light receiving hole 111. For example, the body part 110 includes a housing 112 having an interior space. The light receiving hole 111 is formed at a portion of the housing 112 facing the center of the touch region 30 so as to pass light on to the interior space of the housing 112.

In addition, the body part 110 is provided with a lens 113 and an image sensor 114. The lens 113 is mounted inside the housing 112 to correspond to the light receiving hole 111. The lens 113 forms an optical image of a subject, that is, a touch object. Referring to FIG. 6, the lens 113 is provided in a shape obtained by cutting opposite two sides of a circular lens in parallel to a plane of the touch region 30. Accordingly, the lens 113 has a narrower angle of view in a direction perpendicular to the plane of the touch region 30 when compared to an angle of view in a direction parallel to the plane of the touch region 30. Accordingly, the recognition of a touch position is improved, and the height of the camera module 100 in the direction perpendicular to the plane of the touch region 30 is minimized.

The image sensor 114 receives an optical image of a subject formed by the lens 113, and converts the optical image into an electrical signal. The image sensor 114 may be a charge-coupled device (CCD) image sensor, or a complementary metal-oxide semiconductor (CMOS) image sensor.

The image sensor 114 is disposed in the interior space of the housing 112 to receive light collected through the lens 113. Herein, the image sensor 114 may be disposed in a direction parallel to the plane of the touch region 30 to receive light that is reflected by passing through a light path converter at a rear side of the lens 113.

The light path converter may include a reflection mirror 115. The reflection mirror 115 may be disposed to be inclined at an angle of 45 degrees with respect to the plane of the touch region 30 such that the light passing through the lens 113 travels to the image sensor 114 in a vertical direction. As another example, although not shown, the light path converter may include a prism having a total reflection surface. The total reflection surface may be disposed to be inclined at an angle of 45 degrees with respect to the plane of the touch region 30. In addition, the light path converter may be configured in a variety within a scope in which the light path converter performs the above function.

The light emitting device coupling parts 120 represent parts to which the light emitting devices 21 are coupled, and are formed at both sides of the body part 110 facing a first edge and a second edge of the touch region 30, respectively. In a case in which the touch region 30 is provided in a rectangular shape, one of the first edge and the second edge corresponds to a crosswise edge and the other one corresponds to a lengthwise edge. In a case in which the touch region 30 is provided in a triangular shape or in a pentagonal shape, the first edge and the second edge may correspond to adjacent edges forming an acute angle of the triangle, or an obtuse angle of the pentagon. The light emitting device coupling part 120 may be formed only at one side of the body part 110.

As described above, the camera module 100 is configured to be coupled to the light emitting device 21 through the light emitting device coupling part 120. Accordingly, when the touchscreen is manufactured, the camera modules 100 and the light emitting devices 21 may be more easily and precisely installed on the frame 10.

The camera module 100 may include optical splitter coupling parts 130. The optical splitter coupling part 130 is configured to be coupled to one side end of the optical splitter 26. The optical splitter coupling parts 130 are provided in a way to extend from the light emitting device coupling parts 120 along a first edge and a second edge of the touch region 30, respectively, for example, a crosswise edge and a lengthwise edge. Accordingly, when the touchscreen is manufactured, the optical splitters 26 may be more easily and precisely installed on the frame 10 together with the camera modules 100 and the light emitting devices 21.

For one example, the camera modules 100 are fixed to the frame 10, and thereafter the light emitting devices 21 and the optical splitters 26 are coupled to the camera modules 100, so that the light emitting devices 21 and the optical splitters 26 are consequently aligned with respect to the camera modules 100 and fixed to the camera modules 100. Accordingly, when compared to a case in which the light emitting devices 21 and the optical splitters 26 that are separated from the camera modules 100 are individually installed on the frame 10, the installation process is simplified and a precise installation is ensured. Similarly, for another example, the light emitting devices 21 and the optical splitters 26 are coupled to the camera modules 100, and thereafter the light emitting devices 21 and the optical splitters 26 that are coupled to the camera modules 100 are fixed to the frame 10, so that the installation process is simplified and a precise installation is ensured.

In addition, in a case in which the light emitting device coupling parts 120 are paired with the optical splitter coupling parts 130, respectively, and disposed at the both sides of the body part 110, respectively, facing the crosswise edge and the lengthwise edge of the touch region 30, the camera module 100 is easily coupled to the light emitting devices 21 and the optical splitters 26 regardless on which corners the camera module 100 is located.

Meanwhile, the light emitting device coupling part 120 may include a light emitting device insertion groove 121. The light emitting device insertion groove 121 is configured to support the light emitting device 21 by allowing the light emitting device 21 to be inserted thereinto. For the convenience' sake of description, when one surface of the camera module 100 facing the frame 10 is referred to as a lower surface and the opposite surface of the camera module 100 is referred to as an upper surface, the light emitting device insertion groove 121 is formed in a way to be depressed from the upper surface to the lower surface of the light emitting device coupling part 120. Accordingly, the light emitting device 21 is inserted into the light emitting device insertion groove 121 by being moved from an upper side to a lower side of the camera module 100.

In addition, an outer portion of the light emitting device insertion groove 121, that is, a portion of the light emitting device insertion groove 121 facing the optical splitter coupling part 130 may be open. The light emitting device, being inserted into the light emitting device insertion groove 121, has a light emitting portion thereof positioned at the opening of the light emitting device insertion groove 121. Accordingly, the light emitted from the light emitting device 21 is transmitted to the optical splitter 26 coupled to the optical splitter coupling part 130.

A side portion of the light emitting device insertion groove 121 may have a penetration hole 122 that is passed by a wiring part 142 electrically connected to the light emitting device 21. In addition, the light emitting device insertion groove 121 may be provided to be blocked from the interior space of the housing 112, thereby preventing the light emitted from the light emitting device 21 from leaking to the interior space of the housing 112.

The optical splitter coupling part 130 may be formed while including an optical splitter insertion groove 131. The optical splitter insertion groove 131 is configured to support the optical splitter 26 while allowing one side end of the optical splitter 26 to be inserted thereinto. The optical splitter insertion groove 131 is formed in a way to be depressed from the upper surface to the lower surface of the optical splitter coupling part 130. An extending end of the optical splitter coupling part 130 is provided to be open. The optical splitter insertion groove 131 communicates with the light emitting device insertion groove 121.

In addition, the optical splitter insertion groove 131 has a size suitable for fixedly inserting one side end of the optical splitter 26 thereinto. Accordingly, the one side end of the optical splitter 26 is moved from the upper side to the lower side of the camera module 100, and thus is fixedly inserted into the optical splitter insertion groove 131.

The camera module 100 includes a printed circuit board 140. The printed circuit board 140 is provided with a substrate body part 141 and wiring parts 142. The substrate body part 141 has the image sensor 114 mounted thereon. In this case, a lower surface of the housing 112 is open, and the image sensor 114 is inserted through the open lower surface. The open lower surface of the housing 112 is covered by the substrate body part 141. The substrate body part 141 may be provided with a connector for electrical connection with an external apparatus.

The wiring parts 142 extend from both sides of the substrate body part 141. The light emitting device 21 is electrically connected to an extending end of the wiring part 142. Accordingly, the light emitting device 21 receives an electrical signal, such as power, through the wiring part 142 from the substrate body part 141 on which the image sensor 114 is mounted. In addition, the wiring parts 142 may be provided in a flexible type. Accordingly, if the wiring part 142 is wound as shown in FIG. 5, the light emitting device 21 is inserted into the light emitting device insertion groove 121. In this manner, the wiring part 142 is provided in a compact structure when the light emitting device 21 is inserted into the light emitting device insertion groove 121.

Figure 7:
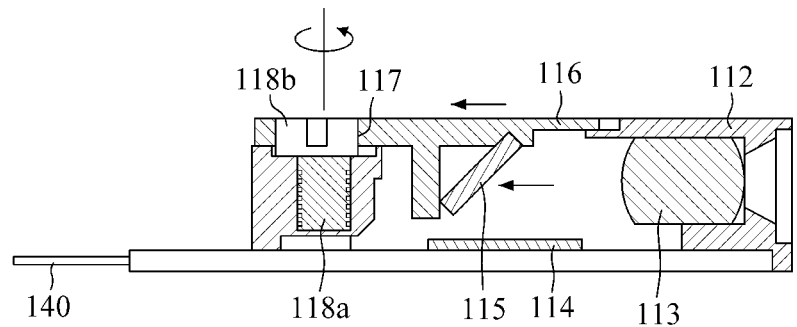
FIG. 7 is a cross-sectional view illustrating a process of adjusting a focus by an adjusting mechanism shown in FIG. 6.

Meanwhile, the camera module 100 is configured to adjust the focus on the image sensor 114. Referring to FIGS. 6 and 7 in conjunction with FIGS. 3 and 4, the body part 110 includes a moving member 116 and an adjusting mechanism 118.

The moving member 116 supports the light path converter, for example, the reflection mirror 115 to be inclined at an angle of 45 degrees. The moving member 116 allows the reflection mirror 115 to move in an optical axis direction of the lens 113 by moving in the optical axis direction of the lens 113 while being guided by the housing 112. For example, the housing 112 is provided at an upper surface thereof with an opening allowing the reflection mirror 115 to move. The moving member 116 is disposed to cover the opening of the upper surface of the housing 112. In addition, the moving member 116 is supported by the housing 112 so as to be slid in the optical axis direction of the lens 113. The moving member 116 is provided with an adjusting hole 117. The adjusting hole 117 is configured to move the moving member 116 through interaction with the adjusting mechanism 118.

The adjusting mechanism 118 may include an insertion part 118a and an eccentric head 118b. The insertion part 118a is insertedly coupled to the housing 112 so as to enable rotation. The insertion part 118a is provided at a circumferential surface thereof with grooves, and thus is easily insertedly coupled to the housing 112. Here, the grooves are formed along the circumference of the insertion part 118a, and are arranged in a longitudinal direction of the insertion part 118a. A structure of the insertion part 118a having no grooves on the circumferential surface is also possible. The eccentric head 118b is eccentrically combined with the insertion part 118a in one body. The eccentric head 118b is inserted into the adjusting hole 117.

In a state in which the insertion part 118a is insertedly coupled to the housing 112, if the eccentric head 118b is inserted into the adjusting hole 117 and rotated, the moving member 116 reciprocates in the optical axis direction. Referring to FIG. 6, if the eccentric head 118b rotates such that a portion of the eccentric head farthest from a center of the insertion part 118a reaches a position close to the lens 113, the moving member 116 moves to a position close to the lens 113 accordingly. In addition, as shown in FIG. 7, if the eccentric head 118b rotates such that the portion of the eccentric head 118b farthest from the center of the insertion part 118a reaches a position far from the lens 113, the moving member 116 moves to a position far from the lens 113 accordingly.

The reflection mirror 115 reciprocates together with the moving member 116 in a process of the moving member 116 reciprocating between the position shown in FIG. 6 and the position show in FIG. 7. Accordingly, if a rotational position of the eccentric head 118b is adjusted, the distance between the lens 113 and the reflection mirror 115 is adjusted, so that the focus on the image sensor 114 is adjusted. After the focus on the image sensor 114 is adjusted, the moving member 116 may be fixed to the housing 112 through various methods, for example, a bonding. As described above, the moving member 116 is moved through interaction between the adjusting mechanism 118 having the eccentric head 118b and the adjusting hole 117, so that the configuration to move the moving member 116 is implemented in a simple manner.

Figure 8:
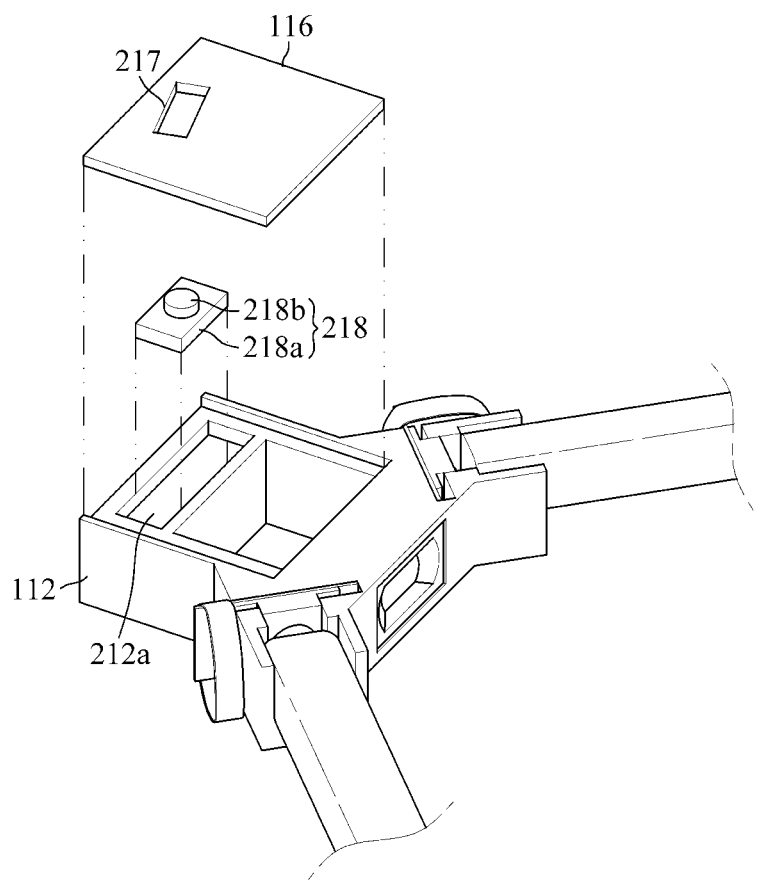
FIG. 8 is an exploded perspective view illustrating another example of the adjusting mechanism.
Figure 9:
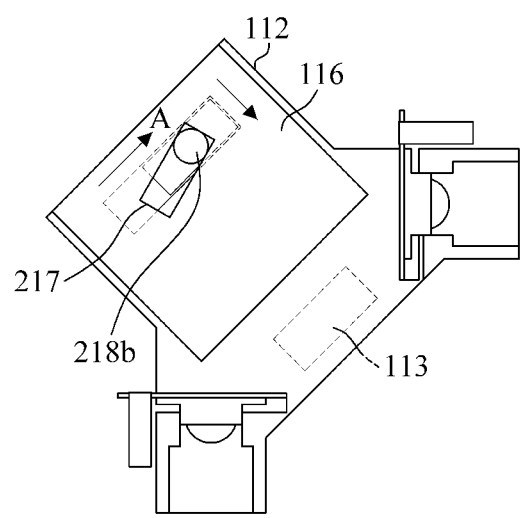
FIGS. 9 and 10 are plan views illustrating a process of adjusting a focus by the adjusting mechanism shown in FIG. 8.
Figure 10:
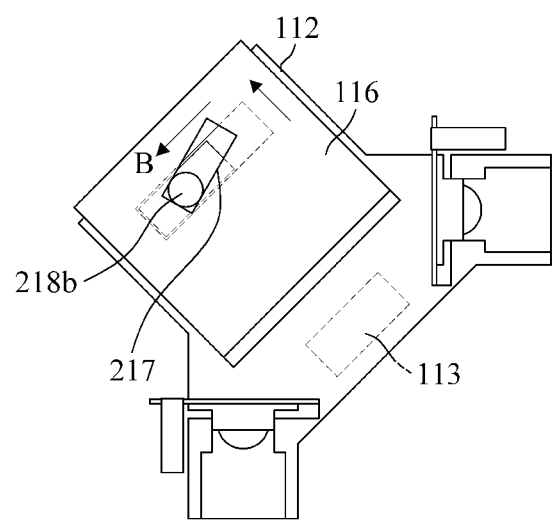

An adjusting mechanism 218 in accordance with another example may be configured as shown in FIGS. 8 to 10. Referring to FIGS. 8 to 10, the moving member 116 is provided with an inclination hole 217. The inclination hole 217 is provided to be inclined with respect to the optical axis direction of the lens 113. The inclination hole 217 is configured to move the moving member 116 through interaction with the adjusting mechanism 218.

The adjusting mechanism 218 may include an adjusting body part 218a and an adjusting pin 218b. The adjusting body part 218a is supported by the housing 112 so as to be slid in a direction perpendicular to the optical axis direction of the lens 113. For example, the adjusting body part 218a may be inserted into a guide groove 212a of the housing 112 and then guided to be slid in a direction perpendicular to the optical axis direction of the lens 113. The adjusting pin 218b protrudes from the adjusting body part 218a and is inserted into the inclination hole 217. The adjusting pin 218b allows the moving member 116 to reciprocate in the optical axis direction, by moving along the inclination hole 217.

That is, as shown in FIG. 9, if the adjusting pin 218b moves to an end point in the direction of an arrow A within the inclination hole 217, the moving member 116 moves to a position that is close to the lens 113. In addition, as shown in FIG. 10, if the adjusting pin 218b moves to an end point in the direction of an arrow B within the inclination hole 217, the moving member 116 moves to a position that is far from the lens 113.

As described above, the position of the adjusting pin 218b is adjusted, so that the distance between the moving member 116 and the lens 113 is adjusted. As a result, the distance between the reflection mirror 115, which is supported by the moving member 116 as described above, and the lens 113 is adjusted, so that the focus on the image sensor 114 is adjusted.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A camera module for an optical touchscreen comprising:
  a body part disposed on one side corner of a touch region, provided with a light receiving hole at a portion thereof facing a center of the touch region, and provided with a lens mounted to correspond to the light receiving hole and an image sensor disposed to receive light collected through the lens; and
  a light emitting device coupling part formed on at least one side of the body part that faces an edge of the touch region, and configured to be coupled to a light emitting device disposed on at least one end portion of a light transmitting rod including micro-grooves,
  wherein the body part comprises:
  a housing having the light receiving hole and configured to accommodate the image sensor to be disposed in a direction parallel to a plane of the touch region;
  a light path converter configured to reflect the light collected through the lens toward the image sensor in a vertical direction;
  a moving member configured to support the light path converter, guided by the housing so as to be movable in an optical axis direction of the lens, and having an adjusting hole; and
  an adjusting mechanism provided with an insertion part rotatably insertedly coupled to the housing, and an eccentric head eccentrically combined with the insertion part and configured to reciprocate the moving member while rotating in a state of being inserted into the adjusting hole,
  wherein if the eccentric head rotates such that a portion of the eccentric head farthest from a center of the insertion part reaches a position close to the lens, the moving member moves to a position close to the lens, if the eccentric head rotates such that the portion of the eccentric head farthest from the center of the insertion part reaches a position far from the lens, the moving member moves to a position far from the lens.

2. The camera module of claim 1, wherein
the light emitting device coupling part comprises a light emitting device insertion groove configured to support the light emitting device by allowing the light emitting device to be inserted thereinto, and
the camera module further comprises a printed circuit board provided with a substrate body part on which the image sensor is mounted, and a wiring part extending from one side of the substrate body part, having an extending end electrically connected to the light emitting device, and upon being wound, allowing the light emitting device to be inserted into the light emitting device insertion groove.

3. The camera module of claim 1, further comprising
an optical splitter coupling part extending from the light emitting device coupling part along each edge of the touch region, and coupled to one side end of an optical splitter that receives light from the light emitting device.

4. A camera module for an optical touchscreen comprising:
a body part disposed on one side corner of a touch region, provided with a light receiving hole at a portion thereof facing a center of the touch region, and provided with a lens mounted to correspond to the light receiving hole and an image sensor disposed to receive light collected through the lens; and
a light emitting device coupling part formed on at least one side of the body part that faces an edge of the touch region, and configured to be coupled to a light emitting device disposed on at least one end portion of a light transmitting rod including micro-grooves,
wherein the body part comprises:
a housing having the light receiving hole and configured to accommodate the image sensor to be disposed in a direction parallel to a plane of the touch region;
a light path converter configured to reflect the light collected through the lens toward the image sensor in a vertical direction;
a moving member configured to support the light path converter, guided by the housing so as to be movable in an optical axis direction of the lens, and having an inclination hole inclined with respect to the optical axis of the lens; and
an adjusting mechanism provided with an adjusting body part supported by the housing so as to be slid in a direction perpendicular to the optical axis of the lens, and an adjusting pin protruding from the adjusting body part and configured to reciprocate the moving member while moving along the inclination hole in a state of being inserted into the inclination hole,
wherein if the adjusting pin moves to an end point farthest from the lens within the inclination hole, the moving member moves to a position that is close to the lens, if the adjusting pin moves to an end point closest to the lens within the inclination hole, the moving member moves to a position that is far from the lens.

5. The camera module of claim 4, wherein
the light emitting device coupling part comprises a light emitting device insertion groove configured to support the light emitting device by allowing the light emitting device to be inserted thereinto, and
the camera module further comprises a printed circuit board provided with a substrate body part on which the image sensor is mounted, and a wiring part extending from one side of the substrate body part, having an extending end electrically connected to the light emitting device, and upon being wound, allowing the light emitting device to be inserted into the light emitting device insertion groove.

6. The camera module of claim 4, further comprising
an optical splitter coupling part extending from the light emitting device coupling part along each edge of the touch region, and coupled to one side end of an optical splitter that receives light from the light emitting device.

* * * * *